No. 611,847.  
B. B. SMITH.  
NUT LOCK.  
(Application filed Nov. 18, 1897.)  
(No Model.)

Patented Oct. 4, 1898.

WITNESS  
John Buckler,  
L. W. Waller

INVENTOR  
Belon B. Smith,  
BY  
Edgar Tate & Co.  
ATTORNEYS

UNITED STATES PATENT OFFICE.

BELON BEE SMITH, OF PENSACOLA, FLORIDA, ASSIGNOR OF ONE-THIRD TO HENRY HYER THORNTON, OF SAME PLACE.

NUT-LOCK.

SPECIFICATION forming part of Letters Patent No. 611,847, dated October 4, 1898.

Application filed November 18, 1897. Serial No. 659,059. (No model.)

*To all whom it may concern:*

Be it known that I, BELON BEE SMITH, a citizen of the United States, residing at Pensacola, in the county of Escambia and State of Florida, have invented certain new and useful Improvements in Nut-Locks, of which the following is a full and complete specification, such as will enable those skilled in the art to which it appertains to make and use the same.

This invention relates to nut-locks; and the object thereof is to provide an improved device of this class which is adapted to be used in connection with rods, bolts, spindles, or similar devices wherever such articles are required.

The invention is fully disclosed in the following specification, of which the accompanying drawings form a part, in which—

Figure 1:
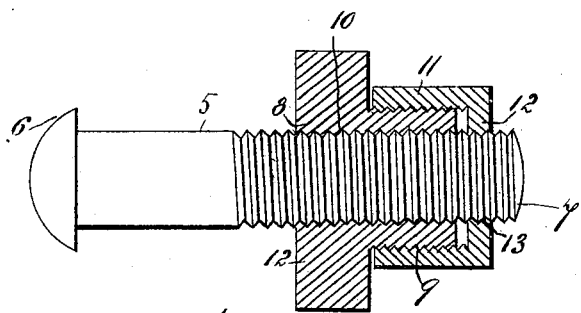
Figure 2:
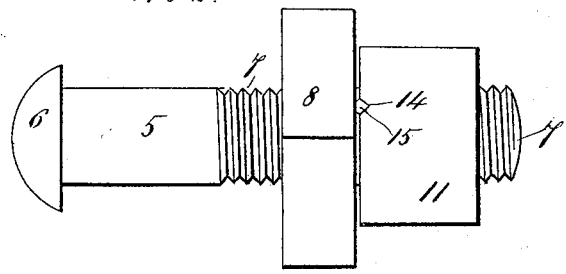
Figure 3:
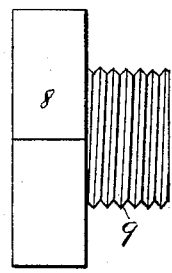

Figure 1 is a side view of a bolt provided with my improved nut-lock, said nut-lock being shown in section; Fig. 2, a side view thereof; Fig. 3, a side view of one part of the device which I employ, and Fig. 4 an end view of the bolt and the nut-lock mounted thereon.

In the drawings forming part of this specification the separate parts of my improvement are designated by the same numerals of reference in each of the views, and in said drawings I have shown at 5 an ordinary bolt provided at one end with a head 6 and the opposite end of which is screw-threaded, as shown at 7, and in the practice of my invention I provide a nut-lock which comprises two separate parts, one of which consists of a main nut 8, which is angular in form and provided with a screw-threaded extension 9.

The screw-threaded extension 9 and the nut 8, on which it is formed, are provided with a central screw-threaded bore 10, through which the bolt 5 passes, and mounted on the screw-threaded extension 9 of the nut 8 is a supplemental nut 11, which is also screw-threaded interiorly and which is closed at its outer end, as shown at 12, and in the closed outer end 12 of the supplemental nut 11 and centrally thereof is formed a screw-threaded opening 13, through which the bolt 5 also passes.

Figure 4:
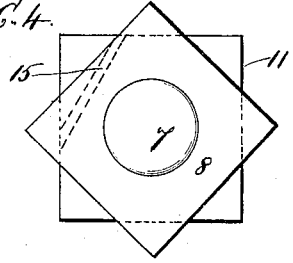

The nut 8 and the supplemental nut 11 are preferably of the same size, and formed diagonally in one corner of the inner end of the supplemental nut 11 is a transverse triangular groove 14, in which in practice is driven a steel locking-pin 15, which is also angular in form, this construction being shown in Fig. 2 and in dotted lines in Fig. 4, and the screw-thread on the outer surface of the extension 9 of the nut 8 is the reverse of that on the bolt 5, or is a left-hand thread, while the interior portion of the supplemental nut 11 is provided with a right-hand thread, and the thread in the central opening 13 of the closed end 12 of the supplemental nut is the same as that formed in the nut 8, and it will be apparent that any desired number of the grooves 14 in the supplemental nut may be provided, and a corresponding number of the key-pins 15 may be employed; but said key-pin 15 is not an absolutely essential feature of this invention, and the operation will be readily understood from the foregoing description, when taken in connection with the accompanying drawings and the following statement thereof.

In practice the nuts 8 and 11 are first connected, as shown in Fig. 1, and are together screwed onto the bolt 5, and the said nuts may then be securely locked together and to the bolt 5 by simply applying a wrench to the nut 8 and turning it slightly either to the right or left, at the same time using considerable force, this operation causing a pressure which is exerted on the threads of the bolt 5 in opposite directions by the nuts 8 and 11, the tension of which is such that said nuts cannot be removed from said bolt, nor can the bolt be removed from the nuts, except by applying a wrench thereto. In practice, however, I prefer to use the key-pin, which will securely lock the separate nuts together and absolutely prevent any movement thereof either upon each other or upon the bolt 5.

My improvement is simple in construction and operation and perfectly adapted to accomplish the result for which it is intended; and, Having fully described my invention, I claim as new and desire to secure by Letters Patent—

A nut-lock comprising a main nut provided with an extension at one side, said nut and said extension being interiorly screw-threaded, and said extension being provided on the outside thereof with a thread which is the reverse of that formed therein, and a supplemental nut which is screw-threaded interiorly, and mounted in said extension, said supplemental nut being closed at its outer end and provided with a central opening in which is formed a screw-thread similar to that in the main nut, and one of said nuts being provided on the side thereof adjacent to the other with a groove, which is adapted to receive a key-pin, substantially as shown and described.

In testimony that I claim the foregoing as my invention I have signed my name, in presence of the subscribing witnesses, this 3d day of July, 1897.

BELON BEE SMITH.

Witnesses:
EGBERT KENDRICK NICHOLL,
JOSEPH EMMET WOLFE.